(12) United States Patent
Nishigaki

(10) Patent No.: US 6,869,197 B2
(45) Date of Patent: Mar. 22, 2005

(54) LIGHT TRANSMITTING PLATE

(75) Inventor: Yoshiki Nishigaki, Niihama (JP)

(73) Assignee: Sumitomo Chemical Company, Limited, Osaka (JP)

( * ) Notice: Subject to any disclaimer, the term of this patent is extended or adjusted under 35 U.S.C. 154(b) by 249 days.

(21) Appl. No.: 10/107,038

(22) Filed: Mar. 28, 2002

(65) Prior Publication Data

US 2002/0145861 A1 Oct. 10, 2002

(30) Foreign Application Priority Data

Apr. 5, 2001 (JP) ........................................ 2001-106907

(51) Int. Cl.⁷ .............................................. F21V 8/00
(52) U.S. Cl. ......................................................... 362/31
(58) Field of Search ......................... 362/31, 551, 582, 362/561

(56) References Cited

U.S. PATENT DOCUMENTS 5,886,759 A * 3/1999 Mashino et al. .............. 349/66

FOREIGN PATENT DOCUMENTS

| JP | 6-210685 A | 8/1994 |
| JP | 11-309761 A | 11/1999 |

OTHER PUBLICATIONS

S.N. 09/840,270 to Y. Nishigaki filed Apr. 24, 2001.*

* cited by examiner

Primary Examiner—Laura K. Tso
(74) Attorney, Agent, or Firm—Sughrue Mion, PLLC

(57) ABSTRACT

The present invention provides a light transmitting plate formed by injecting melted transparent resin into a mold having a pattern on at least one surface of a cavity, wherein the light transmitting plate has a diagonal dimension from 14 inches to 30 inches, a pattern for reflection or diffusion of light on at least one surface, a birefringence value of $9 \times 10^{-6}$ or less in the thickness direction, and the variation in the birefringence values is within $\pm 3 \times 10^{-6}$ from the average. The pattern of the present light transmitting plate is transferred from the pattern on the surface of the cavity at a transfer ratio of 90% or more, and the variation in the transfer ratios is within ±2% from the average. The light transmitting plate of the present invention has a reduced molding strain and hence a low birefringence value, and uniform distribution of the birefringence values and is obtained with low production cost because of the omission of printing process.

6 Claims, 2 Drawing Sheets

LIGHT TRANSMITTING PLATE

BACKGROUND OF THE INVENTION

Technical Field of the Invention

The present invention relates to a light transmitting plate used for a backlight of a liquid crystal display. The present invention especially relates to a large light transmitting plate having a diagonal dimension from 14 inches to 30 inches and a pattern for reflection or dlffusion of light thereon.

Description of Related Art

Figure 1:
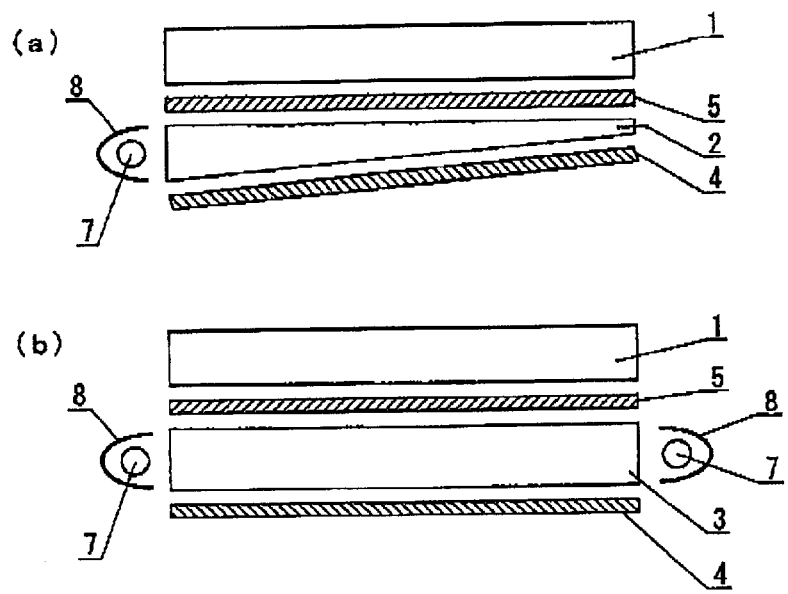

In liquid crystal displays such as notebook type personal computers, desktop type personal computers and liquid crystal display televisions, light transmitting plates are used as optical elements each for transmitting light from a light source arranged on the lateral sides. onto the liquid crystal display screen. FIG. 1 illustrates schematic cross sectional views each showing the arrangement of a liquid crystal display and a light transmitting plate. A backlight arranged behind the liquid crystal display 1 comprises a light transmitting plate 2 or 3, a reflection layer 4 arranged behind the light transmitting plate 2 or 3, a light diffusion layer 5 arranged in front of the light transmitting plate 2 or 3 (on the liquid crystal display side), a light source 7 arranged on a side face of the light transmitting plate 2 or 3, and a reflector 8 for transmitting light from the light source 7 into the light transmitting plate 2 or 3. Light from the light source 7 is reflected inside the reflector 8, and then enters into the light transmitting plate 2 or 3. As being transmitted through the plate, the light is reflected on the reflection layer 4 arranged behind, and thereby emitted to the front side. On the front side, by virtue of the light diffusion layer 5, the emitted light becomes homogeneous over the surface, and then illuminates the liquid crystal display 1. The light source 7 is generally composed of a cold cathode tube.

The reflection layer 4 may be composed of a reflection plate, or alternatively, formed a pattern having a function of reflection on the backside of the light transmitting plate 2 or 3 by a printing method. Further, the light diffusion layer 5 may be composed of a light diffusion plate, or alternatively, formed a pattern having a function of light diffusion on the front side of the light transmitting plate 2 or 3 by a printing method. A prism sheet according to the prior art may be used as the light diffusion layer.

The configuration shown in FIG. 1(a) is used in a smaller display having a diagonal dimension of less than about 14 inches, such as of a notebook type personal computer. The light transmitting plate 2 has a wedge shape having a thickness gradually changing from about 0.6 mm to about 3.5 mm. When such a wedge-shaped light transmitting plate 2 is used, a light source 7 is generally arranged on the thicker lateral side. In the example shown in FIG. 1(a), a single light source 7 is used. However, a plurality of light sources 7 may be used. In contrast, the configuration shown in FIG. 1(b) is used in a larger display, such as of a desktop type personal computer or a liquid crystal display television. The light transmitting plate 3 has a sheet shape having a uniform thickness. When such a sheet-shaped light transmitting plate 3 is used, light sources 7 and 7 are generally arranged on two opposing lateral sides. In the example shown in FIG. 1(b), two light souroes 7 and 7 are used, each on opposing lateral sides. However, in a much larger display, a plurality, such as two, three, or the like, of light sources 7 may be used on opposing lateral sides.

The light transmitting plate 2 or 3 is generally composed of methacrylic resin having a high light transmittance. The wedge-shaped light transmitting plate 2 shown in FIG. 1(a) is produced by injection molding, while the sheet-shaped light transmitting plate 3 shown in FIG. 1(b) is produced with outting out a resin sheet. In production by injection molding, so-called print-less approach is used in some cases. That is, a pattern such as dots or lines is formed in a mold surface, whereby the pattern is transferred to the surface of the molded light transmitting plate, and thereby used as a reflection layer. Further, in some cases, the same approach is used for a diffusion layer. That is, a pattern having the function of diffusion or light orientation is transferred and thereby avoiding the necessity of a diffusion plate or a prism sheet.

When a light transmitting plate having a diagonal dimension of 14 inches or more is produced by injection molding according to the prior art, necessary is a large molding machine having a strong mold clamping force corresponding to the largeness of the size. Further, the largeness of the size extends the distance from the gate to the injection end, and thereby causes a difficulty in the molding. That is, in injection molding, short shot (areas where the resin failed to reach) and the volume shrinkage of the molten resin due to cooling and solidification are supplemented by a sustained pressure. Nevertheless, in case of an extremely long distance from the gate to the injection end, the pressure does not work effectively, thereby sink marks (sunk areas caused by volume shrinkage) can occur, and the shape transferred from the mold surface can be degraded. Accordingly, a large light transmitting plate having a diagonal dimension of 14 inches or more and a pattern for reflection or diffusion of light is not yet produced by an injection molding method. At present, such a large light transmitting plate is produced with cutting out an extruded methacrylic resin sheet.

That is, a light transmitting plate having a diagonal dimension of 14 inches or more, and in particular, 15 inches or more, is fabricated by cutting out an extruded mathaorylic resin sheet of uniform thickness, into a desired size. Then, two, four, or six cold cathode tubes are arranged on the two end faces as baoklights. Such an extruded idthacrylic resin sheet used herein has generally a thickness of from 5 to 15 mm. In this case, generally, a methacrylic resin sheet is roughly cut out, and finally cut by laser cutting. The final cutting serves also as the finishing of the edge faces. Then, a pattern for reflection layer is printed on one surface of the cut sheet, whereby a product is obtained.

In the method in which an extruded methacrylic resin sheet ot uniform thickness is cut out into a light transmitting plate, it is neoesary to provide a reflection layer or a light diffusion layer, or a pattern on the sheet by a printing method instead of these layers, therefore, a producing process and cost of the light transmitting plate increases. Further, the precision in the thickness of the sheet is not sufficiently high. This insufficient precision causes print inhomogensity in a later process, or a gap between the plate and the frame is made when the light transmitting plate is set in the frame. Alternatively, the insufficient precision even prevents the light transmitting plate from being set in the frame. Further, the laser cutting process easily causes droop in the sheet edge faces due to the laser heat, and thereby yields defective articles. This also raises print cost in a later process. Such problems are not found in injection molding.

Nevertheless, large light transmitting plates having a diagonal dimension of 14 inches or more is not yet obtained by a conventional injection molding because of the largeness of the articles as described above, though an injection molding is preferable for producing small light transmitting plates because of few producing processes and low cost.

Further, the transferability of a pattern lowers and the pressure exerted to an article during the molding process is not homogeneous result in increasing the internal stress (molding strain) of the molded article, and thereby causes warp and distortion in the final product. Furthermore, the pattern sustaining ratio of a light transmitting plate formed by conventional injection molding decreases generally after an environmental test for determining the durability. That is, the durability of this light transmitting plate is inferior, and this causes the problem that the reflection and emission of light is degraded, whereby the desired luminance performance is not obtained.

The present inventor has eagerly researched in order to develop a large light transmitting plate which has a diagonal dimension of 14 inches or more, a reduced molding strain, and a pattern for reflection or diffusion of light transferred precisely and homogeneously from a mold, whereby incident light is emitted homogeneously. As a result, the present inventor found that such a light transmitting plate is obtained by a method in which the temperature of the mold cavity surface is maintained higher than the glass transition temperature of the resin with maintaining the resin in the melted state, a screw provided in the cylinder is driven forward slower than in a conventional injection molding, whereby the molten resin is slowly charged into the mold cavity, after the charge, the temperature of the mold cavity surface is lowered below the glass transition temperature of the resin.

SUMMARY OF THE INVENTION

An object of the present invention is to provide a light transmitting plate having a diagonal dimension of from 14 inches to 30 inches, a pattern for reflection or diffusion of light and a low and homogeneous birefringence value.

Another object of the present invention is to provide a light transmitting plate in which a pattern for reflection or diffusion of light diffusaton is transferred precisely and homogeneously.

That is the present invention provides a light transmitting plate formed by injecting melted transparent resin into a mold having a pattern on at least one surface of a cavity, wherein the light transmitting plate has a diagonal dimension from 14 inches tuo 30 inches, a pattern for reflection or diffusion of light on at least one surface, a birefringence value of $9 \times 10^{-6}$ or less in the thickness direction, and the variation in the birefringence values is within $\pm 3 \times 10^{-6}$ from the average.

The present invention provides also the light transmitting plate described above, wherein a transfer ratio of the pattern on the surface of the cavity to a pattern on the light transmitting plate is 90% or more.

A light transmitting plate of the present invention has a pattern for reflection and diffusion of light transferred precisely and a reduced warp and distortion, is obtained with low cost, in spite of the largeness of the size, and homogeneously emits incident light to the front side.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRTPTION OF THE DRAWINGS

Figure 2:
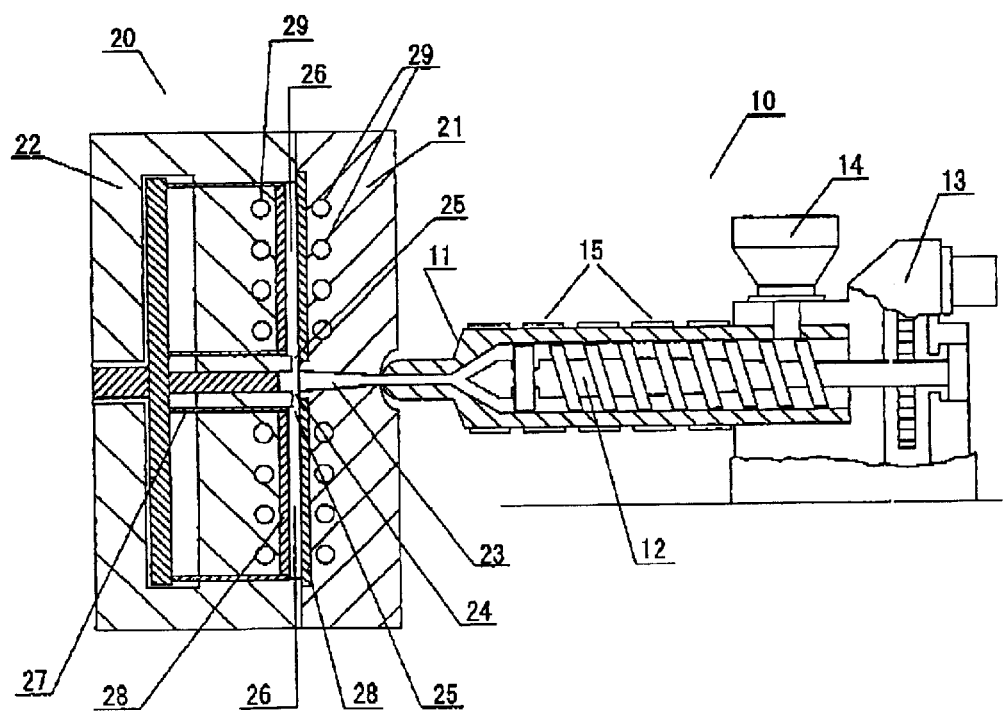
Figure 3:
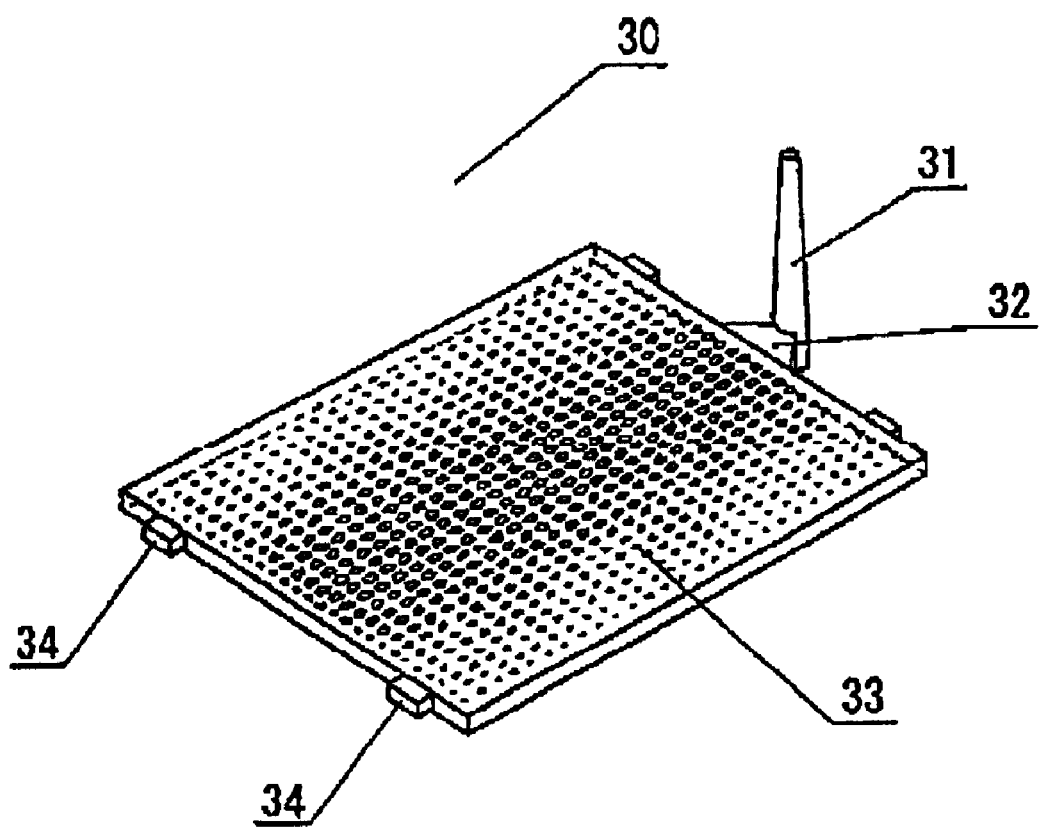

The present invention will become more fully understood from the detailed description given herein below and accompanying drawings which are given by way of illustration only, and thus axe not limitative of the present invention and wherein:

FIG. 1 shows schematic cross sectional views each illustrating the configuration of a liquid crystal display and a light transmitting plate. FIG. 1(a) shows an example of a light transmitting plate having a wedge shape. FIG. 1(b) shows an example of a light transmitting plate having a sheet shape;

FIG. 2 is a schematic cross sectional view showing an example of an apparatus suitable for producing a light transmitting plate according to the invention; and FIG. 3 is a perspective view showing an example of a molded article of a light transmitting plate according to the invention in the form immediately after the removal from a mold.

DETAILED DESCRIPTION OF PREFERRED EMBODIMENT

Transparent resin used for the light transmitting plate may be of any type as long as the material properties are suitable for light transmitting plates. Such resins are thermoplastic resins suitable for melting and molding, and include methacrylic resin, polycarbonate, polystyrene, MS resin composed of copolymers of methyl methacrylate and styrene, amorphous cycloolefin polymers, polypropylene, polyethylene, high-density polyethylene, ABS resin composed of copolymers of acrylonitrlle, butadiene and styrene, polysulfone resin, thermoplastic polyester resin. Methacrylic resin is composed of copolymers mainly composed of methyl methacrylate. The methacrylic resin used herein may be polymer composed solely of methyl methaerylate, or alternatively, copolymers of methyl methacrylate and another monomers (for example, alkyl acrylate such as methyl acrylate and ethyl acrylate) of a small amount up to about 10% by weight. Such transparent resin may contain a mold release agent, a UV absorbing agent, a pigment. a polymerization retardant, a chain transfer agent, an antioxidant, a flame retardant, and the like if necessary.

A fine pattern composed of dots or lines is formed on at least one cavity surface in the mold. This pattern is transferred and imparted to the resin charged in the cavity, and thereby serves as a reflectlon layer pattern for reflecting the light transmitted through the light transmitting plate to the liquid crystal display side, or alternatively, a light diffusion layer pattern for diffusing the emitted light on the front side (emission side) of the light transmitting plate. Obviously, such patterns may be formed in respective surfaces of the mold cavity, whereby the reflection layer pattern and the light diffusion layer pattern are imparted simultaneously.

The pattern in the mold cavity surface can be provided directly in the inner surface of the mold cavity. However, considering the easiness in preparing the pattern and the easiness in changing the pattern into a different one, a cavity plate having a pattern in the surface thereof prepared in advance is preferably inserted or adhered inside the mold. The pattern may be formed by a stamping method, a sand blast method, an etching method, a laser machining method, a mill machining method, an electro-casting method, or the like. The pattern s designed on the basis of optical simulation and the like. For example, a reflection layer pattern used in place of a printed pattern may be a pattern in which the density and the size of the pattern are increased with increasing distance from the light source composed of a cold cathode tube, whereby the emitted light is homogeneously diffused over the light transmitting plate. The material for the cavity plate may be of any type as long as the material is suitable for the formation of the pattern. Thinner thickness thereof is more preferable.

The temperature maintaining and the cooling of the resin charged in the mold cavity are carried out through the cavity surface. Accordingly, the heat exchange of the molded resin depends on the thermal conductivity of the cavity surface.

Considering this point, a material suitable for the mold cavity surface is a metal, such as copper and the alloy thereof, having a thermal conductivity higher than that of the metal (steel, in general) constituting the mold. Especially suitable metal is beryllium-copper which is a copper alloy containing beryllium of .3 to 3% by weight and has a thermal conductivity higher than that of ordinary steel by the factor of 3 to 6. In case that a cavity surface (the surfaces come in contact with the molded resin) without a pattern is to be a mirror finished surface, plating process may be applied in order effectively to improve the mirror finish and to ease the release of the molded article from the mold. Such plating layers include titanium carbide (TiC), titanium carbide nitride (TiCN), titanium nitride (TiN), tungsten carbide ($W_2C$), chromium (Cr), and nickel (Ni). Further, polishing after the plating is also effective.

A light transmitting plate according to the invention is molded directly from melted transparent resin, and has a rectangular shape and a thickness of, generally from about 3 to about 20 mm, and more preferably from about 5 to about 15 mm. The light transmitting plate of the present invention has a diagonal dimension of from about 14 to about 30 inches (about 355 to about 762 mm), and more preferably from about 14 to about 24 inches (about 355 to about 610 mm).

It is necessary that a birefringence value in the thickness direction of the light transmitting plate of the is $9 \times 10^{-6}$ or less, and the variation in the birefringence values is within $\pm 3 \times 10^{-6}$ from the average when the birefringence values are measured in a plurality of portions in the thickness direction. The birefringence value is a dimensionless number obtained by dividing the optical phase retardation in the thickness direction by the thickness. When the birefrimgence values are measured in a plurality of portions in the thickness direction, the maximum value is generally within $9 \times 10^{-6}$. The statement that the variation in the birefringence values is within $\pm 3 \times 10^{-6}$ from the average indicates that when the birefringence values are measured in a plurality of portions in the thickness direction, the difference from the maximum value and the average and the difference from the minimum value and the average are both within $\pm 3 \times 10^{-6}$. The variation in the birefringence values is obtained generally from the measurements in 40 portions or more in a llght transmitting plate. If a birefringence value is more than $9 \times 10^{-6}$ in the thickness direction, warp and distortion in the light transmitting plate become larger, and if the variation in the birefringence values is more than $\pm 3 \times 10^{-6}$, the light transmitting plate becomes inhomogenous. Accordingly, such a light transmitting plate can be not used in practice.

A situation of the molten resin in a conventional injection molding method is considered as described below.

When the transparent resin is melted and the molten resin is injected and charged into a mold, the molten resin moves in fountain flow, and then is cooled and solidified gradually starting from the surface of the molded article. At that time, a lower surface temperature of the mold cavity causes a lager shear stress between the surface (skin layer) and the internal layer of the molded article, or alternatively, a larger anisotropy in the orientation of the molecular chains in the resin.

Also in the pressure sustaining process, a lower temperature of the mold causes a larger inhomogeneity in the pressure exerted to the molded article. This causes inhomogeneity in the volume shrinkage, and hence inhomogeneity in the density of the molded article. The shear stress, the anisotropy in the orientation of the molecular chains, and the inhomogeneity in the density are generically called internal stress. When the internal stress is large, it is stated that the molding strain is large. Such internal stress causes optical phase retardation in the transparent resin, and hence a larger internal stress causes a higher value in the birefringence value calculated from the phase retardation. In other words, in conventional injection molding, the resin is injected and charged into the mold In the melted state having a higher degree of freedom in the molecular level. Then, the molten resin is rapidly cooled and solidified through the contact to the mold cavity surface having a temperature below the glass transition temperature of the resin. At that time, the molecules of the resin are enforced to be cooled and solidified, and thereby stays in a constrained state in which the molecules desire to return into the original stable melted state but can not return. A large molding strain (birefringence) indicates that the enforcement is strong.

Thus, a typical extruded sheet material presently used in large light transmitting plates has a birefringence value of the level of $10^{-6}$, while a typical molded article obtained by conventional injection molding has a birefringence value of the level of $10^{-4}$–$10^{-5}$. According to the invention, the light transmitting plate is directly molded from molten resin, but has a birefringence value of the level of $10^{-6}$ which indicates that the molding strain in as low as that of the present extruded sheet material.

In order to achieve such a low molding strain, such a method is effective that when molten resin come in contact with the mold, the temperature of the mold cavity surface is maintained higher than the glass transition temperature of the resin, and that the mold is cooled after the contact. In this case, an injection molding machine may be used, and the molten resin is injected and charged into the cavity at a very low rate in order to avoid fountain flow, whereby the molding is carried out effectively. Such a method permits a light transmitting plate having a reduced molding strain and hence a low birefringence value, as well as a small variation in the birefringence values in various portions in the thickness direction. For example, such a method may be adopted that: an injection molding machine is used; resin is supplied into a cylinder thereof and then malted; the temperature of the mold cavity surface is maintained higher than the glass transition temperature of the resin; with maintaining the resin in the melted state, a screw provided in the cylinder is driven forward slower than in conventional injection molding, whereby the molten resin is charged into the mold cavity; after the charge, the temperature of the mold cavity surface is lowered below the glass transition temperature of the resin. In the injection and charging of the molten resin into the mold cavity, a method may be used in which the amount of resin is measured and stored by the rotation of the screw provided in the cylinder, and in which the measured molten resin is then charged into the mold cavity by the forward motion of the screw. Further, a method may be used in which as the screw rotates, the molten resin is charged into the mold cavity by the forward driving force caused by the rotation of the screw. The method, in which as the screw rotates, the transparent resin is charged continuously into the mold cavity and thereby molded, is not restricted to a specific one. A molding method called a flow molding may be used.

In the molding process in which molten resin is injected and charged into the mold cavity at a very low rate, the molding machine used has a general configuration similar to that of a conventional injection molding machine. For example, a ROM (read-only memory) for motor driving in a conventional injection molding machine may be modified in order to constitute a molding machine suitable for this method.

In such a method as described above, the surface of the molded article is cooled and solidified more slowly, and the pressure is exerted more homogeneously. This permits a molded article having a reduced internal stres (birefringence). As for the transferability, when the molten resin come in contact with the fine pattern in the mold cavity surface, the resin flows into the recesses of the fine structure more easily at higher temperatures at which the viscosity of the molten resin is lower. In conventional injection molding, when the resin flows inside the mold cavity, the front end of the injected resin is successively cooled, whereby the resin come in contact with the cavity surface in the state of a high viscosity. This causes difficulty in the transfer of a fine shape. In contrast, when the molten resin is injected into the cavity in the state that the temperature of the mold cavity surface is maintained higher than the glass transition temperature of the resin, the front end of the injected resin come in contact with the cavity surface in the state of a sufficiently low viscosity. This permits a high transfer ratio. Further, the sustained pressure for pressing the resin to the pattern in the cavity surface becomes homogeneous. This permits precise transfer in which the variation in the transferability is small. Furthermore, a phenomenon such as a transfer degradation due to the shrinkage during the mold cooling process and a transfer degradation due to heat up and moisture absorption after the molding, which are easily caused by molding strain, is difficult to occur in the surface layer of the pattern in the molded article which has been transferred in the state of low moldlag strain.

Generally, in injection molding, volume shrinkage due to cooling is supplemented by a higher pressure in comparison with the case of cutting out from a sheet material. This causes inhomogeneity in the pressure distribution and hence a larger molding strain (birefringence) in the molded article. Further, the cooling effect of the resin when connecting to the mold is insufficient for the pattern provided in the mold cavity surface to be transferred and imparted with good transferability to the resin surface. Accordingly, as described above, resin is injected and charged into the cavity preferably in the state that the temperature of the mold cavity surface is higher than the glass transition temperature of the resin. After the charge, the temperature of the mold cavity surface is lowered below the glass transition temperature of the resin. As such, the temperature of the resin charged in the cavity is controlled. In such a molding process with the above-mentioned temperature control, the fine pattern provided in the mold cavity surface is precisely transferred to the surface of the molded article. In a more specific example, channels through which heat medium passes are provided in the Inner vicinity of the cavity surface of the mold, whereby hot medium and cold medium are supplied alternately. This temperature control technique is called a hot medlum-cold medium exchange method, and permits a cold-hot cycle molding. The hot medium and cold medium may be composed of machine oil, water, or the like. However, for example, cold medium used preferably is composed of water, while hot medium used preferably is composed of pressurized water. In such cold-hot cycle molding, when a cavity plate composed of metal, such as beryllium copper, having a high thermal conductivity is provided in the mold cavity surface as described above, the rise and fall of the temperature can be achieved in approximately half the time of the case of ordinary steel.

In the molding process, hot medium having a temperature higher than the glass transition temperature of the resin is first supplied into the fluid channels inside the mold, and thereby raising the temperature of the mold cavity surface approximately to the glass transition temperature of the molding resin or higher. In this state, the resin is supplied and melted in the injection cylinder, and then the molten resin is injected and charged into the mold cavity. At this time, in case that as a screw inside the cylinder rotates the molten resin is charged into the mold cavity, the process of supplying the resin into the cylinder by the rotational drive of the screw and the process of infecting and charging the molten resin into the mold cavity are carried out simultaneously. When the molten resin is charged fully to the end of the mold cavity, the resin pressure causes the screw to retract by a predetermined distance, whereby sustaining pressure is applied. At the time of beginning of the sustaining pressure, at a certain time point during the application of the sustaining pressure, or at the time of termination of the sustaining pressure, the medium flowing through the fluid channels inside the mold is changed into cold medium having a temperature below the glass transition temperature of the resin, and more preferably, a temperature below the load deflection temperature, whereby cooling process is carried out. After that, the mold is opened, and the molded article is removed.

By the method described above, the pattern in the mold cavity surface is transferred to the surface of the molded article at a transfer ratio of 90% or higher. The transfer ratio is obtained by measuring roughness of the pattern in the mold cavity surface and roughness of the pattern transferred to the surface of the molded article, which are expressed in terms of the centerline average roughness Ra defined in JIS B 0601. Further, when the transfer ratio is measured in a plurality of portions, the variation in the values is within ±2%, and preferably within ±1%. Transfer is carried out with such good homogeneity. The statement that the variation in the transfer ratios is within ±2% from the average indicates that when the transfer ratios are measured in a plurality of portions, the difference between the maximum value and the average and the difference between the minimum value and the average are both within ±2%. The variation in the transfer ratios is obtained from the measurements in 40 portions or more in a light transmitting plate. If the transfer ratio is less than 90%, a elaborate pattern can be not formed on the light transmitting plate, and if the variation in the transfer ratios is more than ±2%, the light transmitting plate becomes inhomogenous. Accordingly, it is difficult to display a performance required to the light transmitting plate.

A rate of the molten resin injected into the cavity is expressed as an injection rate. An injection rate of the molten resin into the cavity in the present invention is from about 1 to about 15 cm$^3$/sec., preferably about 4 to about 11 cm$^3$/sec in contrast with from about 20 to about 300 cm$^3$/sec in conventional injection molding. The injection rate used herein means the average velocity of injecting the resin to be filled into the mold cavity from the initiation of injecting to the end of filling. The injection rate can be worked out by dividing the product volume (cm$^3$) by the time required for filling the molten resin. The product volume can be obtained from the weight of the product and the specific gravity of the resin. The molten resin is charged into the cavity with very lower injection rate compared with the injection rate of at least about 20 cm³/sec. in the conventional injection molding as mentioned above.

Too low injection rate tends to result in a short shot, poor appearance such as flowmark (flowing marks on the surface), thickness unevenness and poor dimensional precision. If, on the other hand, the injection rate is too high, that can cause shrinking or result in poor thickness unevenness or poor dimensional precision. Even if the same mold is used, the weight of the product will be different depending on the rate at which the molten resin is fed into the cavity, that is, the filling time. The optimum injection rate can be determined by simple preliminary testing.

It is also pointed out that a temperature of the molten resin is an important parameter to obtain a uniform light transmitting. A viscosity of the molten resin may be used in spite of the temperature of the molten resin. The viscosity of the molten resin at the inlet of the mold is so adjusted as to be about 50 to about 5,000 Pa-sec, preferably about 200 to about 1000 Pa sec. It ia desirable that the viscosity of the molten resin is low in view of molding capability. To lower the viscosity could mean to raise the temperature of the molten resin excessively or to increase injection rate. For this reason, the lower limit is about 50 Pa ˙sec. If, on the other hand, the viscosity of the molten resin is too high, the molten resin will solidify before reaching corner of the mold cavity. Therefore, the upper limit is about 5,000 Pa ˙sec.

The viscosity of the molten resin at the inlet of the mold can be worked out as follows.

First, the linear velocity is calculated from the injection rate (cm³/sec) and the sectional area (cm²) at the inlet of the mold by the equation given below. From the result and the thickness (cm) at the inlet of the mold, the shear rate (sec⁻¹) at the inlet of the mold is worked out in a simplified way.

[Linear velocity at mold inlet](cm/sec) =[injection rate] (cm³/sec) /[sectional area at mold inlet] (cm²) [Shear rate] (sec⁻¹)=[linear velocity] (cm/sec) / ([thickness of mold inlet] 2) (cm)

The viscosity of the molten resin at the shear rate can be found by checking against data on the dependence on the shear rate of the viscosity of the resin picked out from a capilograph separately.

A method and an apparatus suitable for producing of a light transmitting plate according to the invention is described below with reference to FIG. 2. FIG. 2 is a schematic cross sectional view showing an example of a molding apparatus. In this molding apparatus, a screw is rotated within a cylinder of the injection molding apparatus, and thereby injecting resin continuously into a mold, whereby molding Is carried out. The molding apparatus comprises an injection apparatus 10 and a mold 20 as major components. The injection apparatus 10 comprises: an injection cylinder 11: a screw 12 for rotating within the cylinder 11 and thereby driving forward; a motor 13 for driving the screw 12; a hopper 14 for supplying resin to the injection cylinder 11; and heaters 15 and 15 provided on the outer surf ace of the injection cylinder 11.

The mold 20 comprises a stationary plate 21 and a movable plate 22. In the stationary plate 21, a sprue 23 is formed of which the sectional area is tapered toward the movable plate 22 and serves as passageway for molten resin. In the confronting surface between the stationary plate 21 and the movable plate 22, a runner 24 is formed along the plates 21 and 22. The runner 24 is in fluid communication with the sprue 23, and the both ends thereof are connected to a gate 25. When the stationary plate 21 and the movable plate 22 are engaged, formed are cavities 26 and 26 for molding a light transmitting plate. The cavities 26 and 26 are in fluid communication with the gate 25. The movable plate 22 is further provided with ejection means 27 for ejecting a molded article in order to remove the molded article. FIG. 2 shows an example in which two molded articles are produced in one molding cycle. However, one molded article, or alternatively, three or more molded articles may be produced by one molding cycle.

The surface on the cavity 26 side of the stationary plate 21 and the surface on the cavity 26 side of the movable plate 22 are formed by respective cavity plates 28 and 28. The article-side surface of any one of the cavity plates or the article-side surfaces of the both cavity plates are provided with a various pattern in advance. The cavity plates are inserted or adhered in the mold. The cavity plate having the pattern is used for pattern transfer. The cavity plates are preferably composed of a material, such as beryllium copper alloy, having a high thermal conductivity as described above. Alternatively, a stainless steel plate or the like provided with a various pattern in advance may be adhered onto the surface of the cavity plate composed of beryllium copper alloy or the like. The cavity plates 28 and 28 are preferably provided in the cavity surfaces of both of the stationary plate 21 and the movable plate 22. However, in case that the pattern is provided only in one inner surface of the cavity, the cavity plate 28 may be provided only in that surface.

Inside the stationary plate 21 and the movable plate 22, fluid channels 29 and 29 for hot medium and cold medium are embedded along the cavity 26. A temperature control apparatus comprising a control unit supplies the hot medium and the cold medium into the fluid channels 29 and 29 alternately depending on the purpose. Accordingly, the temperature of the mold, more specifically, the temperature of the cavity plates 28 and 28, is raised or lowered during the molding cycle. The fluid channels 29 and 29 are preferably provided in both of the stationary plate 21 and the movable plate 22. However, the fluid channels 29 may be provided only in any one of the stationary plate 21 and the movable plate 22, whereby the hot medium and the cold medium may be alternately supplied thereinto. Also in this case, similar effect is obtained.

Described below is an example of a method in which the injection apparatus 10 and the mold 20 are used in order to mold a large light transmitting plate having a pattern transferred therein. However, a method for producing a light transmitting plate according to the invention is not restricted to this. First, in the state that the screw 12 is approximately in the most advanced position, the motor 13 drives and rotates the screw 12. At the same time, the hopper 14 supplies resin to the injection cylinder 11. At this time, the temperature of the mold, more specifically, the temperature of the surface on the cavity 26 side of the cavity plates 28 and 28, is preferably set at the glass transition temperature of the molding resin or higher. However, when necessary in the cycle, the temperature may be below that temperature at the beginning of injection. Nevertheless, the temperature of the surface on the cavity 26 side of the cavity plates 28 and 28 needs to be at the glass transition temperature of the resin or higher in the subsequent pressure sustaining process. The supplied resin is plasticized by the heat from the heaters 15 and 15 and the heat from the shear and friction forces due to the rotation of the screw 12, and then mixed. At the same time, the resin is conveyed toward the front side of the screw 12 by the rotational conveying effect by the screw 12, and thereby transferred continuously through the sprue 23 and the gate 25 into the cavity 26. At this time, back pressure is applied such that the resin pressure during the charge does not cause the screw 12 to retract, but that the resin pressure when the cavity 26 is filled causes the screw 12 to retract.

When the closed space of the cavity 26 is filled with the molten resin injected therein, the pressure of the filling resin causes the screw 12 to retract slightly. When the screw 12 retracts by a predetermined distance, appropriate sustaining pressure is applied such as to supplement the volume shrinkage of the molten resin cooled in the mold 20. At the time of beginning of the sustaining pressure, cold medium is supplied into the fluid channels 29 and 29. When the molded article is cooled down to a temperature at which the molded article does not deform even if removed, the movable plate 22 is opened, and then the ejecting means 27 ejects and removes the molded article. The method of removing the molded article is not restricted to such a method using the ejecting means 27, and may be any known method. After the removal of the molded article, the medium flowing through the fluid channels 29 and 29 is changed into hot medium, whereby the temperature of the surface on the cavity 26 side of the cavity plates 28 and 28 is raised again preferably to the glass transition temperature of the resin or higher. The movable plate 22 is closed, and the next producing cycle is begun.

Using such an apparatus, the movable plate 22 is first moved toward the stationary mold 21, whereby the mold is closed. Molten resin is injected into the closed cavity 26 constituted by these two plates. The injection molding temperature of the molten resin (the temperature of the resin in the injection cylinder 11) is generally 170 to 300° C. In case of methacrylic resin, the temperature of 190 to 270° C. permits good molding. The temperature of the mold is generally in the range between 30 to 150° C. However, as described above, the temperature is preferably set at the glass transition temperature of the resin or higher during the processes from the injection and charging of the resin to the termination of sustaining pressure. The glass transition temperature of the methacrylic resin is approximately 105° C. Then, the apparatus is maintained with the sustaining pressure for a predetermined time. The medium flowing through the fluid channels 29 and 29 is changed into cold medium, by timer setting or valve switching such that the temperature of the mold cavity surface becomes below the glass transition temperature of the resin at the time of termination of the cooling process. After the cooling process, the mold is opened, and the cooled article is removed.

The molding article (light transmitting plate) obtained in these processes has a reduced molding strain and hence a low birefringence value. Further, the pattern in the mold cavity surface is precisely transferred thereto. At least one surface of the molded article is provided with a pattern serving as a reflection layer or a light diffusion layer. Accordingly, subsequent printing process is eliminated. As such, the number of processes is reduced in comparison with the case of a light transmitting plate produced by cutting out a methacrylic resin sheet, which is presently used in a backlight for a large liquid crystal display. Further, considering that a large methacrylic resin sheet can deform during transportation and treatment, the invention is concluded to reduce the total cost per a light transmitting plate.

FIG. 3 is a schematic perspective view showing an example of a light transmitting plate molded according to the invention in the state immediately after the removal from the mold. The molded light transmitting plate 30 comprises a sprue 31, a gate 32, a light transmitting plate body 33, and attaching and ejecting parts 34 and 34. The gate 32 is eliminated after the molding. In this example, a pattern provided in the cavity plate in advance is transferred to the surface on the stationary plate side of the light transmitting plate body 33. The pattern is determined on the basis of optical simulation. The pattern may be any known pattern having the function of reflecting or diffusing incident light, and possible patterns include a circle, a triangle, a rectangle, or the like, a dot pattern composed thereof in combination, a groove pattern of a slit shape, a line pattern of a ridge shape, a stain finish pattern, and the like. In case of a dot pattern, the diameter of each dot and the density of dots are generally increased with increasing distance from the light source side. In case of a dot shape, the diameter or the side length of each dot is generally 100 to 1,500 µm, while the spacing between the dots is generally 200 to 1,200 µm. In case that the pattern is a reflection layer pattern, the pattern is preferably modulated gradually and continuously within the above-mentioned range depending on the distance from the light source side on the basis of optical simulation.

EXAMPLES

The present invention is described below in further detail with reference to the examples. However, the invention is not restricted to these examples.

Example 1

In this example, a molding apparatus "Nestal 200SYCAP" of Sumitomo Heavy Industries, Ltd. was used. A ROM thereof was modified such that as a screw inside a cylinder rotated, resin was charged continuously into a mold, and that the molding was thereby carried out. The mold was designed in a size such that the mold was capable to being mounted in a molding apparatus having a mold clamping force of 200 tons. A single molded article was produced in the cavity. The light transmitting plate body was similar to that shown in FIG. 3, and designed in a size of 31 cm×24 cm and a thickness of 6 mm.

The cavity surface of the stationary plate which corresponds to the reflection layer side was provided with an adhered cavity plate which was composed of beryllium copper alloy of high conductivity containing 0.5% of beryllium by weight and 1.6% of nickel by weight and had a circle dot pattern prepared on the surface thereof in advance by etching in instead of printing. In this dot pattern, each dot was larger in the center portion in the longitudinal direction, while each dot became smaller with increasing distance from the center. Dots in the center had a diameter of approximately 1.0 mm and a pitch of approximately 1.5 mm. In contrast, dots on the light source side had a diameter of approximately 0.6 mm and a pitch of approximately 1.5 mm. On the other hand, the cavity surface of the movable plate which corresponds to the emission layer side was provided with a cavity plate which was composed of the same beryllium copper alloy as that described above and had nickel plating thereon and a mirror polished surface. Fluid channels each having a diameter of 15 mm were provided approximately 9 mm inward from the surface of the cavity plate in the inside of the stationary plate and the movable plate in order to raise and lower the mold temperature during the cycle. Then, cold medium of cold water at approximately 30° C. provided from a cold medium unit and hot medium of pressurized water at approximately 130° C. provided from temperature control unit for a hot medium were supplied into the fluid channels alternately. whereby cold-hot cycle was obtained.

Resin used was transparent methyl methacrylate resin "Sumipex MG5" of Sumitomo Chemical Co, Ltd. The resin temperature in the injection cylinder was set at 235° C. The rotation speed of the screw was 90 rpm. When hot medium was supplied into the fluid channels in the mold, the temperature of the cavity surface measured with a surface thermometer was set at 125° C. The stationary plate and the movable plate were closed together. The methyl methacrylate resin was injected into the cavity formed by the plates. When the cavity was filled with the resin, the resin pressure caused the screw to retract by 10 mm. On completion of the retraction, sustaining pressure was applied. At this time, the medium flowing through the fluid channels was changed into cold medium, whereby cooling was carried out such that the temperature of the cavity surface became 85° C. at the time of termination of the sustaining pressure. The system was maintained in this state for 30 seconds, and then the sustaining pressure was released. Since the surface temperature of the molded article reached 70° C. in approximately 60 seconds after the change into cold medium, the mold was opened after the cooling process. Then, the molded article was removed. After that, the temperature was raised again such that the temperature of the cavity surface became 125° C. The mold was closed, and the next producing cycle was begun.

It is noted that the viscosity of the molten resin at the inlet of the mold worked out by the above-mentioned method was 490 Pa•sec and the injection rate of the molten resin was 5.5 $cm^3$/sec.

In-plane thickness distribution was measured with a dial gauge for five samples of obtained molded articles. The variation in the thickness was ±0.07 mm. Further, the above-mentioned operations were repeated so as to obtain 100 light transmitting plates. Then, the outer dimensions of respective light transmitting plates were measured with a caliper in order to evaluate the dimension stability. As a result, the variation in the dimension was ±0.16 mm.

When the total light transmittance was measured for an obtained light transmitting plate having a thickness of 6 mm according to JTS K 7105, the transmittance was 92%.

When birefringence values were measured in 70 portions in the thickness direction in each single light transmitting plate using an automatic birefringence meter "KOBRA-CCD/X" of Oji Scientific Instruments, the values fell within a range between $4 \times 10^{-6}$ to $6 \times 10^{-6}$, while the variation from the average was $\pm 1 \times 10^{-6}$. Here, the birefringence value was obtained by dividing the optical phase retardation measured in the thickness direction of a sample by the thickness thereof.

The centerline average roughness Ra defined in JIS B 0601 was measured with a three-dimensional surface roughness meter of Tokyo Seimitsu Co., Ltd. in order to evaluate pattern transferability. When the centerline average roughness in a portion of the mold cavity surface and the centerline average surface roughness in the corresponding portion of the surface of the molded article were measured in 40 portions, a transferability of 99 to 100% was obtained. The variation from the average was ±0.5%. Further, the light transmitting plate after the molding was maintained in an oven at 85° C. for 5 hours, and after that, the pattern sustainability was measured in a similar manner. As a result, the degradation in the surface roughness was uniform and as low as approximately 1%. Thus, it has been confirmed that the degradation does not cause any problem. As such, the reflection layer pattern in place of a printed pattern was transferred precisely and uniformly.

Although a light transmitting plate of the present invention is molded directly from molten resin and has a diagonal dimension from 14 inches to 30 inches and a pattern for reflection or diffusion of light, the light transmitting plate has a reduced molding strain and hence a low birefringence value, and uniform distribution of the birefringence values. Such a light transmitting plate is obtained first. The pattern for reflection or diffusion of light is transferred from the mold surface uniformly at a high transferability. This permits the omission of printing process and hence the reduction of production, as well as an improvement in the total production cost.

The invention being thus described, it will be obvious that the same may be varied in many ways. Such variations are not to be regarded as a departure from the sprit and scope of the invention, and such modifications as would be obvious to one skilled in the art are intended to be included within the scope of the following claims.

What is claimed is:

1. A light transmitting plate formed by injecting molten transparent resin into a mold having a pattern on at least one surface of a cavity, wherein the light transmitting plate has a diagonal dimension from about 355 to about 762 mm, a pattern for reflection or diffusion of light on at least one surface, a birefringence value of less than or equal to $9 \times 10^{-6}$ in the thickness direction, and the variation in the birefringence values is within $\pm 3 \times 10^{-6}$ from the average birefringence value.

2. The light transmitting plate according to claim 1, wherein a transfer ratio of the pattern on the surface of the cavity to a pattern on said light transmitting plate is 90% or more.

3. The light transmitting plate according to claim 2, wherein the variation in the transfer ratios is within ±2% from the average.

4. The light transmitting plate according to claim 1, wherein a thickness of said light transmitting plate is from 3 mm to 20 mm.

5. The light transmitting plate according to claim 1, wherein the transparent resin is methacrylic resin.

6. The light transmitting plate according to claim 1, wherein a figure of the pattern is dots or lines.

* * * * *